Oct. 1, 1968     E. H. HALL     3,404,051

METHOD OF SPLICING THERMOPLASTIC ROPE ENDS BY FLAME TREATMENT

Filed March 9, 1965

INVENTOR.
EDWARD H. HALL
BY

ATTORNEYS

United States Patent Office 3,404,051
Patented Oct. 1, 1968

3,404,051
METHOD OF SPLICING THERMOPLASTIC ROPE ENDS BY FLAME TREATMENT
Edward H. Hall, Fitchburg, Mass., assignor to Morey Paper Mill Supply Co., Fitchburg, Mass., a corporation of Massachusetts
Filed Mar. 9, 1965, Ser. No. 438,303
2 Claims. (Cl. 156—82)

ABSTRACT OF THE DISCLOSURE

Method of permanently joining the ends of a paper machine carrier rope which consists predominantly of thermoplastic synthetic material by exposing the ends to be joined to an open flame thereby melting the end surfaces, and placing the melted end surfaces in abutting relation, and so holding them until the melted plastic has congealed.

---

This invention pertains to cordage, in particular, to cordage of a diameter of ¼ inch or more customarily referred to as "rope" and more especially to a novel method of joining the ends of two lengths of rope, or of uniting the opposite ends of a length of rope to form an endless band, the joining here referred to being in the nature of a splice as contrasted with a knot. The invention resides in the novel procedure for making a splice whereby, in a very simple way, the rope ends are securely and permanently joined and in such a manner that the diameter at the joint is not appreciably greater than the diameter of the rope at other points.

More specifically, the invention concerns a method of cohesively joining rope ends wherein the rope consists of or is predominantly of synthetic fibrous material which is thermoplastic as, for example, filament nylon. As a specific example of the utility of the invention, it has been found of a special utility in making or repairing the endless ropeband which is used in papermaking machinery and known as a "carrier rope."

In the past, and even at the present time, such carrier ropes are customarily made of the fibrous material customarily employed in the rope-making industry as, for example, hemp or cotton. Rope is customarily made either by twisting several strands or cords (for example three) and laying them together to form the rope or cable, or by braiding strands or cords together so as to form a braided rope, either hollow or having a core. However, in recent years it has become common to make ropes of synthetic fibers, for example, nylon and paper-machine carrier ropes are now customarily made of nylon or predominantly of nylon.

For paper-machine use, ropes of the above types have customarily been formed into the desired endless bands by a conventional manual splicing procedure, employing a marlin or equivalent spike whereby, after ravelling out a length of each of the rope ends to be united, the strands of the unravelled portion are separated to permit the free ends of the strands to be introduced between the unravelled strands whereby, if the operation be skillfully performed, a strong and permanent joint results. If the rope to be joined is a braided rope of hollow or tubular form, then the wall of the rope may be opened up to permit the opposite rope end to be drawn into the interior of the hollow braid. On the other hand, in the event that the braided rope has a core, then as a preliminary step, a short length of core material must be removed from each rope end. The ends of the core, which itself is tubular, are then united by the procedure above described for joining the ends of coreless braided rope. Lastly, a short length of the outside sleeve is drawn into the center of the rope to bury it. Whether the rope be of one type or the other, the splicing operation demands skill and is time consuming and if, during the operation of a papermaking machine, which in commercial production is expected to run 24 hours a day, the rope breaks, it is not always easy to obtain a skilled splicer without substantial delay, so that much time may be wasted before the rope can be spliced and the machine restarted with resultant financial loss to the mill. Furthermore, even when the splice has been completed and though the splicer be highly skilled, a length of the rope, in the region of the splice, is necessarily of substantially larger diameter than the original rope and as this enlarged portion passes about the guide pulleys or drums of the machine at the very high velocity at which such ropes are run, the passing of the larger portions about the pulleys results in vibration and rapid wear so that breakage of the rope most frequently appears in the region of the splice.

The present invention solves the above difficulties first because a splice, made in accordance with this invention, may be made by a person having no particular skill in the splicing of rope; secondly because the novel splice resulting from the practice of the invention does not appreciably increase the diameter of the rope at the region of the splice; and thirdly because a negligible portion of the rope must be sacrificed in the making of the splice, and thus the total length of the rope available for forming the band is not substantially decreased even if, in the course of time, several splices must be made. Furthermore, there is no special tendency of the rope to break during use at the region of the splice while, at the same time, the splice, made in accordance with the present invention, provides a joint which is substantially as strong in resisting tension stress as the rope itself.

Being familiar with the difficulties involved in the manufacture of the carrier ropes used in the paper industry and having become acquainted with the fact that nylon (of which, as above noted, carrier ropes are now commonly made) is thermoplastic and melts at a low temperature, the present inventor conceived the idea of cohesively uniting the end portions of nylon rope by fusion of the nylon itself. Although it might be possible to form a splice by overlapping the end portions of the rope, after first applying heat such as to cause the overlapping portions to melt and then subjecting them to pressure, the result of such a procedure would be that at the region of the splice there would be an enlargement similar to that resultant from customary rope splicing. However, as the result of experiment, the astonishing discovery was made that if the ends to be joined were cut off square, that is to say, in a plane perpendicular to the axis of the rope and then the freshly cut end faces were heated to melting and then were butted together in coaxial relation and in registry and firmly pressed together and so held until the melted material had cooled and set, that there was produced an ideal joint of the same diameter as the normal rope and substantially as strong in response to tensile stress as the rope itself. This procedure, in joining the ends of a rope or joining two pieces of rope, is effective whether the rope be the customary twisted or spun rope or whether it be braided, either hollow or with a core. By this simple procedure, a splice may be made in a matter of a few minutes and by a person having no skill in ordinary rope splicing. The resultant splice which adds substantially nothing to the diameter of the rope will pass about guide pulleys or sheaves without bumping, and thus does not set up undesirable vibrations in the machine and does not subject the rope to stresses in passing about guide pulleys, or the like, such as to result in early breakage of the rope at the splice.

The invention may be practiced without the assistance of special tools or appliances, although, in a copending application, Ser. No. 438,282, filed Mar. 9, 1965, now issued as Patent No. 3,359,151, dated Dec. 19, 1967, a tool or appliance has been disclosed and claimed which facilitates the operation. As a matter of fact, such a splice may be made, after preparing the rope ends, merely by playing a small torch flame over the ends and then by hand pressing them into contact and holding them until the melted material has cooled and set.

It has been found desirable to bind the rope by a wrapping, for instance a wrapping of cord or tape, close to the point at which the splice is to be made in order that the constituent strands of the rope may not separate in response to the pressure applied in forcing the ends together, although such binding is not essential.

Figure 1:
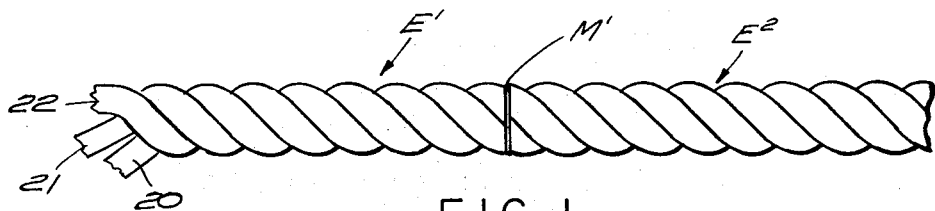
FIG. 1 is a fragmentary view showing two rope ends arranged in axial alignment and with their ends permanently joined by a cohesive splice made in accordance with the present invention.

Referring to FIG. 1 of the drawings, the characters $E^1$ and $E^2$, respectively, designate two rope ends, for example portions of two independent ropes or the opposite ends of a single length of rope. As shown in FIG. 1, these ropes are shown as spun ropes, that is to say, ropes made in accordance with usual rope-making procedure in which a plurality of strands, for example the three strands 20, 21 and 22, are first individually twisted and then laid together and released so that they intertwine. As shown in FIG. 1, these rope ends are disposed in coaxial relation and their opposed ends are cohesively united at $M^1$ by material which was originally a part of the rope ends themselves. Specifically, assuming that the rope ends are predominantly of a thermoplastic material, for example nylon, the material at $M^1$ whereby the rope ends are joined consists of nylon which has been melted and then congealed, more particularly, some of the nylon comprised in each rope end which has been heated to a melting point and then by moving the rope ends, in coaxial relation toward each other until the molten nylon coalesced, and then holding the parts relatively immovable until the molten nylon has cooled sufficiently to set. It may be noted that the joint thus formed is not substantially larger in diameter than the original rope and that its extent axially of the rope is very small. As a matter of fact, the thickness of this joining material, measured axially of the rope, may be of the order of one millimeter. However, by the procedure described, the joint so formed is permanent and substantially as strong in resisting tensioning force applied to the rope as is the rope itself.

Figure 2:
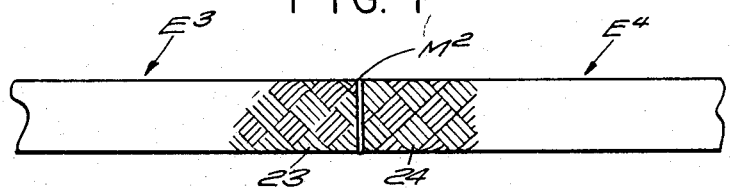
FIG. 2 is a similar view showing two ends of braided rope similarly joined.

In FIG. 2 the characters $E^3$ and $E^4$ indicate rope ends wherein the constituent strands or yarns 23 and 24 (for example) of each rope end are concatenated by a braiding operation. The braiding may be so carried out as to provide a single-walled tubular braid, or to provide a plurality of concentric braids, or the braiding may constitute merely a jacket about a core strand of any desired type, for instance a twisted cord or a bundle of parallel threads or filaments. In any event, assuming that the rope ends are predominantly of a thermoplastic such as nylon, the joint at $M^2$ may be formed in the same way as that above described, namely by heating the ends of the rope ends to melting temperature and then, while keeping the rope ends in axial alignment, moving them toward each other until the molten surfaces coalesce and then retaining them in this relative position until the molten material has set.

Figure 3:
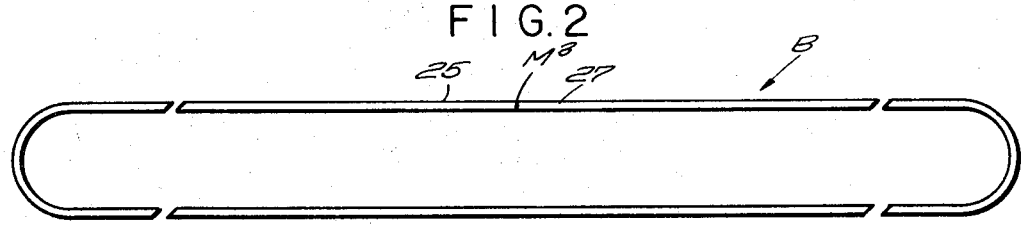
FIG. 3 is a fragmentary view illustrating an endless band made of rope, such as a paper-machine carrier rope, and having a splice according to the present invention whereby the ends of a single length of rope are joined.

In FIG. 3 there is illustrated an endless band, for example a paper-machine carrier rope, which may consist of a single unitary length of rope whose opposite end portions 25 and 27 are united at $M^3$ by the same procedure as that above described with respect to FIGS. 1 and 2, it being assumed that the rope which forms this endless band V will be, at least predominantly, of a thermoplastic synthetic such, for example, as nylon. Such a rope band, formed by uniting the opposite ends of a single length of rope as just suggested, may be used in a papermaking machine as above described and, if broken during service, its ends may again be united very simply, easily and quickly by the above procedure.

Figure 4:
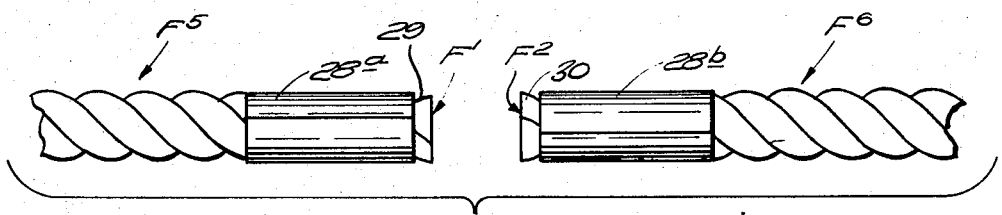
FIG. 4 is a fragmentary view showing two rope ends prepared in accordance with the preferred practice of the present invention in readiness for splicing.

In FIG. 4 a preferred procedure is illustrated at an early stage wherein the rope ends $F^5$ and $F^6$, which are shown as twisted rope, have been cut off squarely in planes perpendicular to the axis of the respective rope end, so as to form the plane surfaces $F^1$ and $F^2$.

Preferably, before the cutting operation, the end portion of each rope is provided with a binding 28a and 28b, respectively, such as to keep the constituent strands of the rope end from ravelling. Such a binding may be of adhesively-coated tape or, for example, a serving of twine, whatever binding is employed being applied under tension.

In any event, the binding is so arranged as to expose a short section 29 and 30, respectively, of the rope end beyond the end of the binding. Preferably the bindings are applied before the ends of the rope are cut off square, so that during the cutting the strands will not be ravelled out or frayed.

Figures 5, 6:
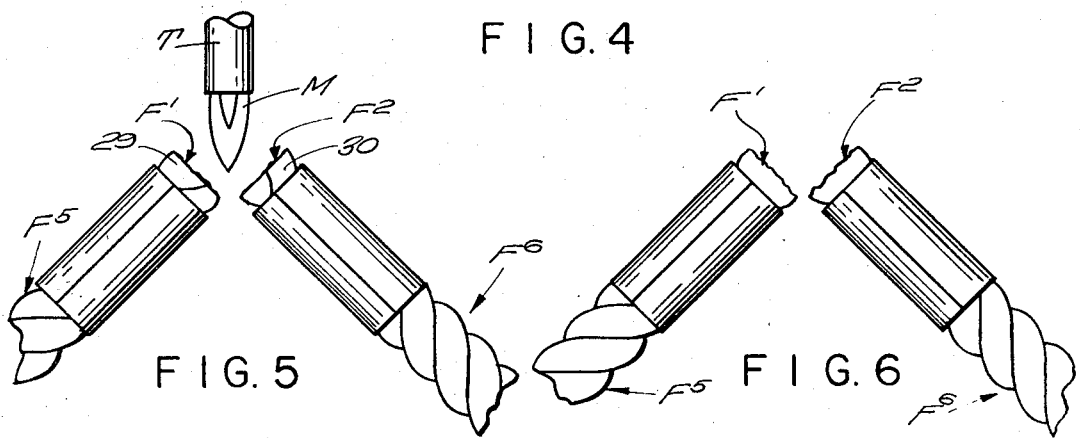
FIG. 5 is a view showing the rope ends illustrated in FIG. 4, but arranged in convenient position for heating them simultaneously by a torch flame.
FIG. 6 shows the same rope ends as they appear after the application of the flame and in readiness to be placed in registering relation and pressed together.
Figure 7:
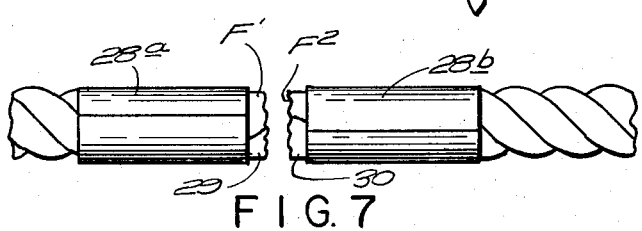
FIG. 7 shows the same rope ends, arranged in coaxial relation with their molten ends opposed and ready to be pressed together.

Having prepared the two rope ends as just described, they are first conveniently relatively arranged as shown in FIG. 5, so that the plane end surfaces $F^1$ and $F^2$ are disposed at an angle (here shown as about 90°). While in such relative position heat is applied simultaneously to both surfaces, as by introducing a torch T between them as shown in FIG. 5, so that the flame M of the torch heats the surfaces $F^1$ and $F^2$ simultaneously and to substantially the same degree. The flame is applied until the material at the surfaces $F^1$ and $F^2$ has been melted as shown in FIG. 6, whereupon the flame is withdrawn and the rope ends are arranged in coaxial relation as shown in FIG. 7, with the molten end faces opposed to each other. The rope ends are then moved relatively toward each other (keeping the rope ends in coaxial relation) until these molten faces coalesce. They are then kept in this position under some pressure for a sufficiently long time for the molten material to cool and congeal, thereby providing a joint or splice such as illustrated in FIGS. 1 and 2.

While the two rope ends may be held in the positions of FIGS. 5 and 7 in any suitable manner, or, for example, by hand, the operation is facilitated by the employment of some sort of tool or implement whereby the rope ends may be held in appropriate position while the torch is applied and/or while the molten end faces are pressed against each other and held. An implement appropriate for such use is more fully disclosed in the above copending application for Letters Patent, Ser. No. 438,282, filed Mar. 9, 1965, now issued as Patent No. 3,359,151, dated Dec. 19, 1967.

While one desirable embodiment of the invention is herein disclosed by way of example, it is to be understood that the invention is broadly inclusive of any and all modifications falling within the scope of the appended claims.

I claim:

1. The method of permanently joining two rope ends wherein the constituent strands of each rope end are of nylon, providing each rope end with a plane end surface, perpendicular to the axis of the respective rope end, simultaneously exposing the respective end surfaces to an open flame until the thermoplastic material at said end surfaces is melted, arranging the rope ends in coaxial relation and with the melted surfaces opposed to each other, so relatively moving the rope ends as to contact said melted surfaces, and while disposing the rope ends in coaxial relation, pressing said opposed surfaces against each other until the melted material coalesces, and holding the rope ends relatively stationary until the melted material has congealed.

2. The method according to claim 1, further characterized in that, before severing each rope end, a binding is applied such as to prevent separation of the constituent strands of the rope end, and in severing each rope end, so locating the cut as to leave a very short length of the rope end, protruding from the binding, between the end of the binding and the cut.

References Cited
UNITED STATES PATENTS

| | | | |
|---|---|---|---|
| 2,466,951 | 4/1949 | Hunter | 24—38 XR |
| 2,596,513 | 5/1952 | Tocci-Guilbert | 156—159 XR |
| 2,722,590 | 1/1955 | Engler | 156—258 XR |

PHILIP DIER, *Primary Examiner.*